(12) United States Patent
Thomas et al.

(10) Patent No.: US 11,082,738 B2
(45) Date of Patent: Aug. 3, 2021

(54) FASTER DETERMINATION OF A DISPLAY ELEMENT'S VISIBILITY

(71) Applicant: Microsoft Technology Licensing, LLC, Redmond, WA (US)

(72) Inventors: Antony Deepak Thomas, Mountain View, CA (US); Manohar Sreenivasachar, Santa Clara, CA (US); Krishna Sunil Yekasi, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 14/833,040

(22) Filed: Aug. 21, 2015

(65) Prior Publication Data
US 2017/0055022 A1  Feb. 23, 2017

(51) Int. Cl.
| | |
|---|---|
| *H04N 21/431* | (2011.01) |
| *H04N 21/442* | (2011.01) |
| *G06Q 30/02* | (2012.01) |
| *H04N 21/426* | (2011.01) |
| *H04N 21/81* | (2011.01) |

(52) U.S. Cl.
CPC ..... *H04N 21/4316* (2013.01); *G06Q 30/0241* (2013.01); *G06Q 30/0242* (2013.01); *H04N 21/42653* (2013.01); *H04N 21/442* (2013.01); *H04N 21/812* (2013.01)

(58) Field of Classification Search
CPC ......... H04N 21/4316; H04N 21/42653; H04N 21/4425; H04N 21/812; H04N 21/2668; H04N 21/235; G06T 11/60; G06T 5/005; G06T 5/50; G06T 7/004; G06T 2007/20221; G06K 9/6217; H04H 20/14; H04H 60/37; H04H 60/59
See application file for complete search history.

(56) References Cited

U.S. PATENT DOCUMENTS

| | | |
|---|---|---|
| 8,024,223 B2 | 9/2011 | Cradick et al. |
| 8,407,090 B2 | 3/2013 | Kitchen et al. |
| (Continued) | | |

FOREIGN PATENT DOCUMENTS

WO    2008001472 A1    1/2008

OTHER PUBLICATIONS

"Ad Visibility", ADTECH, Mar. 27, 2014, pp. 2.

*Primary Examiner* — Alexander Gee
(74) *Attorney, Agent, or Firm* — Rainier Patents, P.S.

(57) ABSTRACT

A simplified and accelerated determination of how much of a display element, generated by instructions executing on a computing device, is displayed is achieved through approximations based on a two-dimensional array whose dimensions are commensurate with a size of the display element. Each entry in the array is initialized to one binary value. If the display element is cut off by either physical display boundaries or by boundaries of a host display element, or if it is overlapped by another element, then the entries in the array corresponding to those portions of the display element that are not visible are changed to another binary value. Subsequently, the quantity of entries in the array having the original, initialized binary value, as compared with the total quantity of entries in the array, can provide an accurate approximation for how much of the display element was displayed.

20 Claims, 6 Drawing Sheets

(56) References Cited

U.S. PATENT DOCUMENTS

| | | | |
|---|---|---|---|
| 8,412,569 B1 | 4/2013 | Benson et al. | |
| 8,412,572 B2 | 4/2013 | Cosman | |
| 2011/0029393 A1 | 2/2011 | Apprendi et al. | |
| 2011/0157227 A1* | 6/2011 | Ptucha | H04N 5/232 |
| | | | 345/638 |
| 2011/0196735 A1 | 8/2011 | von Sydow et al. | |
| 2012/0256915 A1 | 10/2012 | Jenkins | |
| 2012/0324098 A1 | 12/2012 | De Jager et al. | |
| 2013/0088505 A1* | 4/2013 | Jain | G06T 11/203 |
| | | | 345/589 |
| 2013/0185164 A1* | 7/2013 | Pottjegort | G06Q 30/02 |
| | | | 705/14.73 |
| 2014/0019262 A1 | 1/2014 | Reitsma et al. | |
| 2014/0150013 A1* | 5/2014 | Fauqueur | H04N 21/23412 |
| | | | 725/32 |
| 2014/0279029 A1 | 9/2014 | Ma | |
| 2014/0281901 A1 | 9/2014 | Mostowy et al. | |

\* cited by examiner

FASTER DETERMINATION OF A DISPLAY ELEMENT'S VISIBILITY

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon. Computer application programs can also be supported through advertising revenue. For example, computer application programs can be distributed by their authors without charge to users. As part of such application programs, however, users can be presented with advertisements, and the authors of such application programs can be compensated, by advertisers, for the display of such advertisements, thereby receiving compensation for their efforts in creating or improving the application programs without directly charging users to utilize such application programs. Advertisers are charged, and advertising hosts, such as the aforementioned application programs, are compensated when an advertisement is displayed to one or more users.

SUMMARY

The determination of how much of a display element, generated by a computer program executing on a computing device, is actually visible to a user, and thus "displayed", can be simplified and accelerated through approximations based on a two-dimensional array whose dimensions are commensurate with a size of the display element. Each entry in the array can be initialized to one binary value. If the display element is cut off by either physical display boundaries or by boundaries of a host display element, then the entries in the array corresponding to the portions of the display element that are cut off can be changed to another binary value. Similarly, if the display element is overlapped, and thus visually covered, by other display elements, then the entries in the array corresponding to those portions of the display element that are blocked can, likewise, be changed to the other binary value. Determinations of whether the display element is cut off or covered can be based on traversals of a view hierarchy or other document object model defining the visual presentation of one or more computer programs. Subsequently, the quantity of entries in the array having the original, initialized binary value, as compared with the total quantity of entries in the array, can provide an accurate approximation for how much of the display element was displayed and can do so through operations that can be performed more quickly and more efficiently than polygon surface area determinations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
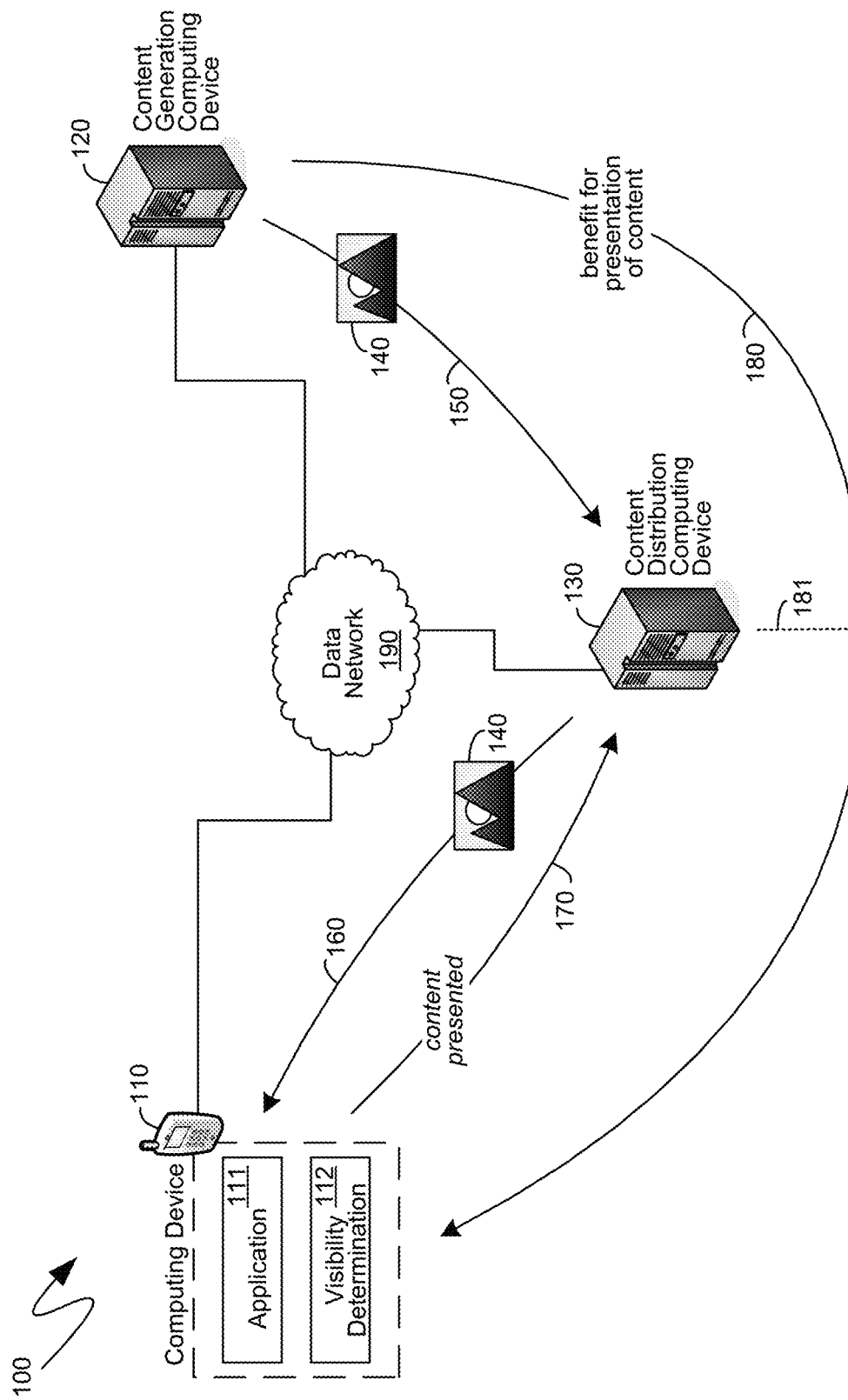
FIG. 1 is a system diagram of an exemplary system for utilizing determinations of display elements' visibility.

The following description relates to simplifying and accelerating the determination of how much of a display element, generated by a computer program executing on a computing device, was actually visible to a user, and thus "displayed". Approximations can be based on a two-dimensional array whose dimensions are commensurate with a size of the display element. Each entry in the array can be initialized to one binary value. If the display element is cut off by either physical display boundaries or by boundaries of a host display element, then the entries in the array corresponding to the portions of the display element that are cut off can be changed to another binary value. Similarly, if the display element is overlapped, and thus visually covered, by other display elements, then the entries in the array corresponding to those portions of the display element that are blocked can, likewise, be changed to the other binary value. Determinations of whether the display element is cut off or covered can be based on traversals of a view hierarchy or other document object model defining the visual presentation of one or more computer programs. Subsequently, the quantity of entries in the array having the original, initialized binary value, as compared with the total quantity of entries in the array, can provide an accurate approximation for how much of the display element was displayed and can do so through operations that can be performed more quickly and more efficiently than polygon surface area determinations.

The techniques described herein make reference to "display elements". As will be recognized by those skilled in the art, there is a distinction between digital data that is representative of an image, and the corresponding physical generation of such an image on a physical display device that creates a visual presentation of such an image. However, those of skill in the art understand such distinction purely from context, and utilize equivalent terminology to, interchangeably, refer to either the digital data representative of an image, or the physical, visual generation of such an image on a physical display device. Thus, as utilized herein, the term "display element", depending on context, means either the visual representation physically generated on a physical display device, or the digital data whose interpretation, or execution, by a computing device causes the computing device to physically generate, the visual representation, on the physical display device, in accordance with such digital data. Thus, depending on context, a display element can either be a visual element, physically generated on a physical display device, or the digital data defining such a visual element, such as a digital encoding of an image, or a programming structure that delineates aspects of the generated visual presentation, such as a window, a tab, a frame, or other like container object. Explicit distinction, however, will be made when referencing the size of a display element. More specifically, the term "graphical size" means the size or dimensions of an image in quanta of digital data, such as pixels or other like quantization of an image when represented in digital data. By contrast, the term "visual size" means the size or dimensions of an image as physically determined by the visual, and physical, representation of such an image on a physical display device.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 is shown as comprising a computing device 110 executing an application 111 and a visibility determination component 112. As will be described in further detail below, the execution, by the computing device 110, of the application 111 can enable the application 111 to cause the physical generation, on a physical display device communicationally coupled to the computing device 110, of visual content in the form of display elements. For various reasons, the ability of such display elements to be visually perceived by a user of the computing device 110, colloquially their "visibility", can be desirable to determine. To provide additional context for such reasons, the exemplary system 100 of FIG. 1 further comprises a content generation computing device 120 and a content distribution computing device 130 that can be communicationally coupled to one another, and to the computing device 110, through a data network, such as exemplary data network 190. The content generation computing device 120 can generate visual content, such as exemplary visual content 140, that is to be displayed on multiple computing devices, such as exemplary computing device 110. Analogously, the content distribution computing device 130 can receive such visual content 140 from the content generation computing device 120, as illustrated by the communication 150, and can distribute such visual content to computing devices, such as exemplary computing device 110, as illustrated by the communication 160. One common scenario in which visual content, such as the visual content 140, can be desirable to be displayed on multiple computing devices can be in an advertising context, where the content generation computing device 120 can be an advertising agency or an enterprise generating advertising for its products or services, and the content distribution computing device 130 can be an advertising server. In such a scenario, a determination of whether or not an advertisement was visible can trigger the provision of some form of benefit, such as payment, from an advertiser to an entity hosting and displaying advertisements. Nevertheless, while advertising presents one common scenario in which the mechanisms described herein can be utilized, they are not limited to advertising scenarios and are equally applicable to any scenario in which the visibility of a display element is sought to be determined.

Returning to the exemplary system 100 of FIG. 1, the visual content 140, hereinafter referred to as the display element 140, in accordance with the explicit definitions provided herein, can be displayed, on a display device communicationally coupled to the exemplary computing device 110, by the application 111. A visibility determination component 112 can execute, such as in accordance with the mechanisms described herein, to determine whether the display element 140 is visible in its presentation, to a user of the computing device 110, by the application 111. If the visibility determination component 112 determines that the display element 140 was visible, a notification, such as exemplary notification 170, can be generated, such as to the content distribution computing device 130, informing the content distribution computing device 130 that the display element 140 was visibly displayed on the computing device 110. Such a notification 170 can cause the content distribution computing device 130 to trigger 181 a transfer of benefits 180 from an entity associated with the content generation computing device 120 to an entity associated with the computing device 110, such as an entity associated with the application 111 or an entity associated with content, such as a webpage, viewed, on the computing device 110, through the execution of the application 111. As indicated previously, in an advertising context, the benefits 180 can be monetary, but the mechanisms described herein are not so limited and are equally applicable to the transfer of any form of benefit, either directly or indirectly, from entities associated with the content generation computing device 130 to entities associated with the display, on the computing device 110, of the display element 140.

Figure 2:
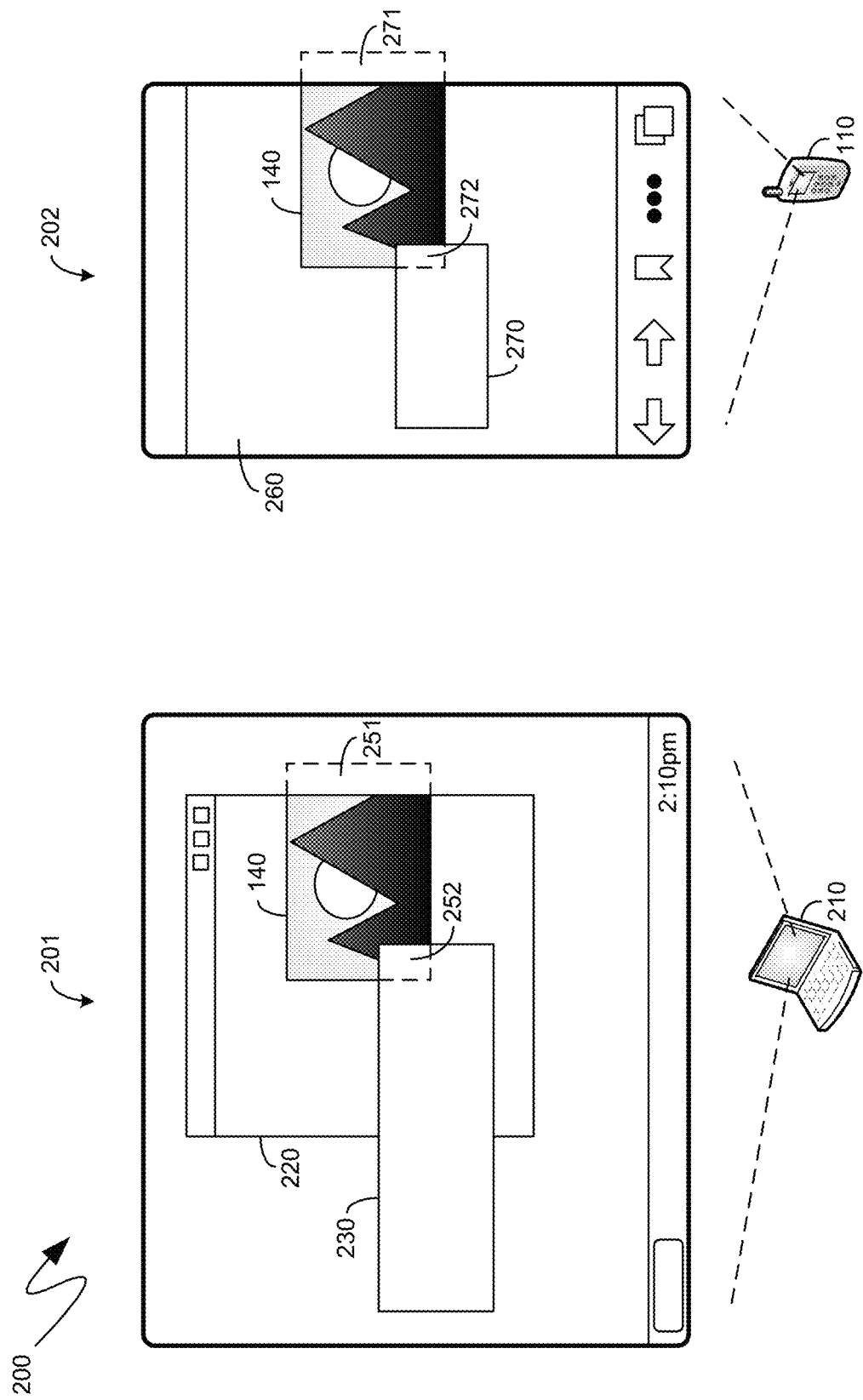
FIG. 2 is a block diagram of exemplary user interfaces within which the visibility of display elements can be determined.

Turning to FIG. 2, exemplary user interfaces illustrating exemplary visual presentations of the display element 140 are illustrated. For example, the exemplary user interface 201 shows a common windowing environment in which the visual presentation, on a physical display device communicationally coupled to a computing device, is presented within visual elements evocative of windows or other like view portals. To illustrate the operation of the mechanisms described herein, the display element 140 is illustrated in the exemplary user interface 201 as being displayed within a window 220. By way of further example, the display element 140 is illustrated as having been positioned within the window 220 such that a portion 251 of the display element 140 is cut off by the window 220. More specifically, and as illustrated in FIG. 2, the portion 251 of the display element 140 is not visible to the user because it extends beyond a boundary of the window 220. As another example, the display element 140 is illustrated as being overlapped by at least a portion of the window 230 such that the portion 252 of the display element 140 is not visible due to its position as being visibly "behind" the exemplary window 230. In instances such as that illustrated exemplary user interface 201, in order to determine whether the display element 140 was sufficiently visible, and thus "displayed" to a user, such as for purposes of triggering a transfer of benefits, prior determinations relied upon surface area calculations in accordance with polygon mathematics that were complex and required increased processing by the computing device, thereby rendering them slow and computing resource intensive. By contrast, the mechanisms described herein simplify the determination of how much of a display element, such as the display element 140, is visible to the user in order to facilitate determination of whether the display element 140 was sufficiently "displayed" to a user, such as for purposes of triggering a transfer of benefits.

While the exemplary user interface 201 illustrates a common windowing environment, such as often presented by desktop or laptop computing devices, such as the exemplary laptop computing device 210, those of skill in the art will recognize that other computing devices, such as tablet computing devices, smartphone computing devices, and other like computing devices, often utilize a different user interface environment, such as exemplary user interface 202. As can be seen from the exemplary interface 202, however, presentation of a display element, such as the exemplary display element 140, can still result in the display element 140 having portions thereof, such as exemplary portions 271 and 272, not visible to a user. For example, an application can execute on the exemplary computing device 110 that can generate visual content within the display area 260. Such an application can position, within the display area 260, the exemplary display element 140 in such a manner that a portion 271 of the display element 140 is cut off by the physical boundaries of the physical display device on which the display area 260 is being displayed. The portion 271, of the display element 140, is not visually presented to the user in the exemplary user interface 202 due to the position of the display element 140, and its relationship to the boundaries of the physical display device rendering such a visual display. As another example, a notification, such as exemplary notification 270, can have been generated, such as by an operating system of the exemplary computing device 110, and such a notification 270 can have been visually generated "over" the display area 260 such that visual content within the display area 260, including the portion 272 of the display element 140, is not visible to the user.

Figure 3:
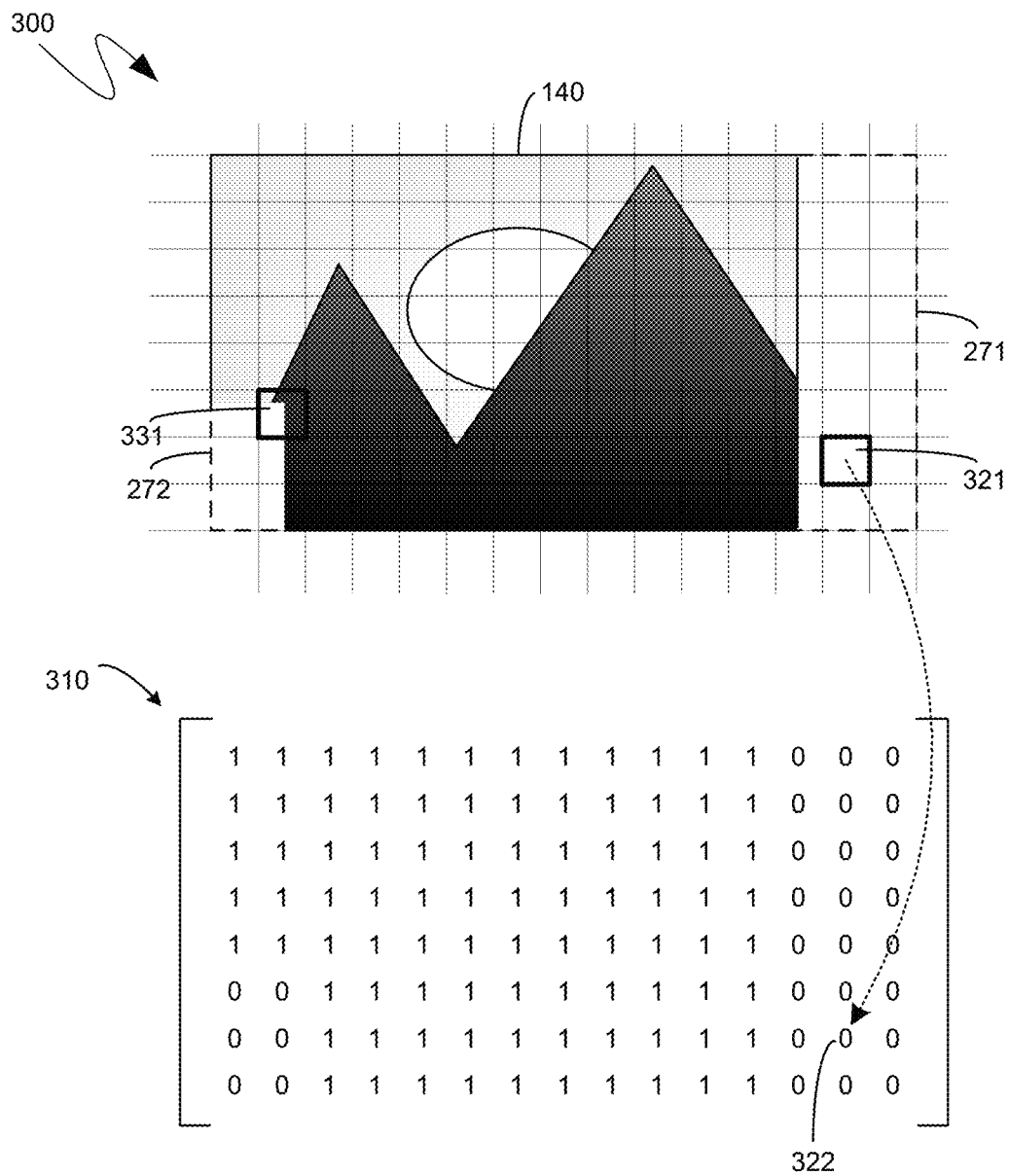
FIG. 3 is a block diagram of an exemplary mechanism for determining a display element's visibility.

How much of the display element 140 was visually presented to a user can facilitate determination of whether the display element 140 was sufficiently "displayed", such as for purposes of triggering a transfer of benefits. Turning to FIG. 3, the exemplary system 300 shown therein illustrates an exemplary two dimensional array 310 that can have been generated based upon the exemplary display element 140 whose visibility is to be determined. According to one aspect, the size of the two-dimensional array 310 can be commensurate with the graphical size of the exemplary display element 140. More specifically, the display element 140 can be divided into segments, divisions, or other quantum, such as exemplary quantum 321. The quantity of rows and columns of the exemplary two-dimensional array 310 can be commensurate with graphical size of the display element 140 as measured in those quantum. For example, the exemplary display element 140 is shown in FIG. 3 as being divided into fifteen horizontal divisions and eight vertical divisions. Correspondingly, the exemplary two-dimensional array 310 comprises fifteen columns and eight rows. The size of the divisions, into which the display element 140 is divided, can be as small as a pixel, pica, point, or other unit of graphical image information representation. Thus, for example, if the display element 140 was an image having a resolution of one-thousand twenty-four pixels by seven hundred and sixty-eight pixels, then the corresponding two-dimensional array could have one-thousand twenty-four columns and seven hundred and sixty-eight rows.

Initially, each entry in the two dimensional array can be initialized to a single value, such as a single binary value. For example, the exemplary array 310, shown in FIG. 3, was initialized with each entry having a binary value of "one". Subsequently, as it is determined that a portion of the display element 140, corresponding to an entry in the array 310, is not visible, the value of that entry can be changed to a different value, such as the opposite binary value from its initialization value. For example, the exemplary array 310, shown in FIG. 3, illustrates entries whose value was changed to zero when the corresponding portion of the display element 140 was determined to not be visible. Thus, when the portion 271 of the display element 140 was determined to be cut off, and, thus, not visible, for each division of the display element 140 in the portion 271, such as the quantum 321, a corresponding entry, such as the corresponding entry 322, in the table 310, can have its value changed to "zero".

In some instances, a single quantum of the display element 140, corresponding to a single entry in the array 310, can have some portions of such a quantum be visible and other portions not be visible. For example, as illustrated in FIG. 3, the exemplary quantum 331 can have only a portion of that quantum 331 be visible, while another portion of that quantum 331 can be cut off, or otherwise not displayed. In such instances, according to one aspect, a determination can be made as to whether a majority of the quantum is displayed, or greater than some other threshold percentage of the quantum is displayed, and, if such an amount of the quantum is displayed, then the corresponding entry in the array 310 can remain set at its initialized value. According to another aspect, all of a quantum can be required to be displayed in order for the corresponding entry in the array 310 to remain set at its initialized value, and, if any part of the quantum is cut off or otherwise not displayed, then the corresponding entry, in the array 310, can be changed to a value indicating that that corresponding portion of the display element 140 was not displayed. According to yet another aspect, if any portion of a quantum is displayed, the corresponding entry in the array 310 can remain set at its initialized value.

Another consideration that can be made in determining whether to change the value of an entry in the array 310 can be an evaluation of the transparency of whatever other display element is blocking a portion of the display element 140 from being displayed. For example, and turning back to FIG. 2, the notification 270 is shown as blocking a portion 272, of the display element 140, from being displayed. As will be recognized by those skilled in the art, however, certain notifications, such as operating system notifications, can be presented with some transparency such that other display elements, such as, for example, exemplary display element 140, can be visible through such notifications even though such notification can be visually layered on top of them. In such an instance, and returning to FIG. 3, a determination can be made as to whether the portion 272, of the display element 140, is somewhat visible due to transparency of the display element that has cut off the portion 272 and otherwise prevented it from being fully displayed. For example, if a determination is made that the display element overlaying the portion 272, of the display element 140, has a transparency greater than a predetermined threshold amount, then the portion 272 can be considered to be visible and the entries in the array 310 corresponding to the portion 272 need not be changed from their initialized value. Conversely, if a determination is made that the display element overlaying the portion 272 has a transparency that is less than a predetermined threshold amount, the portion 272 can be considered to be blocked, and not visible, and the entries in the array 310 corresponding to the portion 272 can be changed from their initialized values such as, for example, by being sent to a value of "zero" as shown in the example illustrated in FIG. 3.

Figure 4:
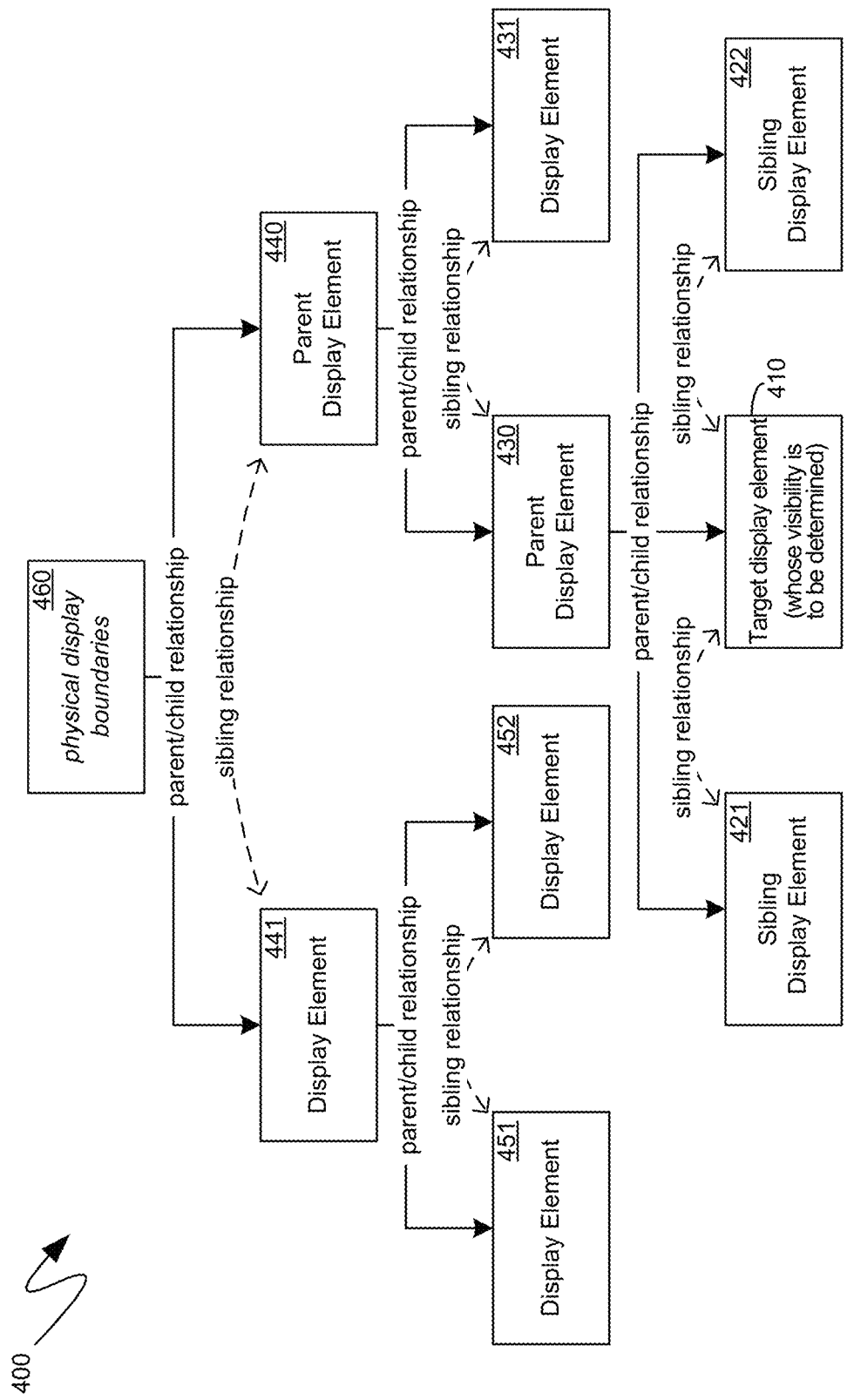
FIG. 4 is a block diagram of an exemplary view hierarchy within which the visibility of a display element can be determined.

A determination of whether or not a display element, such as exemplary display element 140, has portions thereof cut off, blocked or otherwise not displayed due to the arrangement of other display elements, can be based on a traversal of the view hierarchy, or other like document object model. Turning to FIG. 4, an exemplary view hierarchy 400 is illustrated comprising display elements 410, 421, 422, 430, 431, 440, 441, 451 and 452. A topmost layer of the view hierarchy, such as exemplary topmost layer 460, can represent the overall displayable area on, for example, a physical display device communicationally coupled to the computing device performing the traversal of the view hierarchy 400 and, thereby, generating visual representations of the display elements of the view hierarchy 400 on the physical display device. A display element, such as the exemplary display element 410, can be a display element whose visibility is sought to be determined. As utilized herein, the term "target display element" means a display element, as explicitly defined above, whose visibility is to be determined, such as in accordance with the mechanisms described herein.

A traversal of the view hierarchy 400 can be performed, such as in a manner well known to those skilled in the art, to determine whether portions of the target display element 410 are visible and, correspondingly, in accordance with the mechanisms described above, whether corresponding portions of a corresponding two-dimensional array, are to have their entries remain with an initialized value, or whether such entries are to be changed to a different value reflective of those portions of the target display element not being visible. For example, a traversal of the view hierarchy 400, for purposes of determining the visibility of the target display element 410, can commence at the level of the target display element 410, such as by evaluating whether either of the sibling display elements 421 and 422 overlap the target display element 410. Subsequently, traversal of the view hierarchy 400 can proceed to a higher level and can determine, for example, whether a parent display element within which the target display element 410 is contained, such as the exemplary parent display element 430, has boundaries that cut off the display of a portion of the target display element 410, such as in the manner described above. Traversal of the view hierarchy 400 can then continue at the level of the parent display element 430 and can consider whether siblings to the parent display element 430, such as the exemplary display element 431, overlap portions of the parent display element 430 containing the target display element 410. Once an evaluation of the level of the parent display element 430 has completed, processing can proceed to a still higher level, such as the level of the parent display element 440 and can determine whether the parent display element 440 has boundaries that cut off display of the parent element 430 and, thus, in turn, the target display element 410. Traversal of the view hierarchy 400 can proceed at the level of the parent display element 440 and can consider whether sibling display elements, such as the display element 441, overlap the display element 440 and, thereby, overlap at least a portion of the parent display element 430 and the target display element 410. When considering sibling display elements, such as the display element 441, traversal of the view hierarchy 400 can proceed to lower levels of such sibling display elements, thereby considering, for example, whether either of the display elements 451 or 452 overlap the target display element 440. Ultimately, a determination can also be made whether the physical display boundaries 460 cut off a portion of the target display element 410.

According to one aspect, such a traversal can be performed multiple times, once for individual portions of the target display element 410, while, according to an alternative aspect, such a traversal can be performed once and the determinations made during such a traversal can be applied to discrete portions of the target display element 410 at each step. Additionally, while the aforementioned descriptions were illustrated within the context of an example in which entries in an array corresponding to the target display element 410 were initialized with one value, and then changed to another, different value if corresponding portions of the target display element 410 were determined to not be visible, those of skill in the art will recognize the equivalence of initializing an array corresponding to the target display element 410 with entries having one value, and then changing the value of those entries to another, different value if corresponding portions of the target display element 410 are determined to be visible. In other words, the mechanisms described herein differentiate between visible and not visible portions through values assigned to entries in an array corresponding to the target display element, and are independent of the specific values used, and whether such values are changed based upon the visibility, or, conversely, the lack of visibility, of corresponding portions of the target display element.

Figure 5:
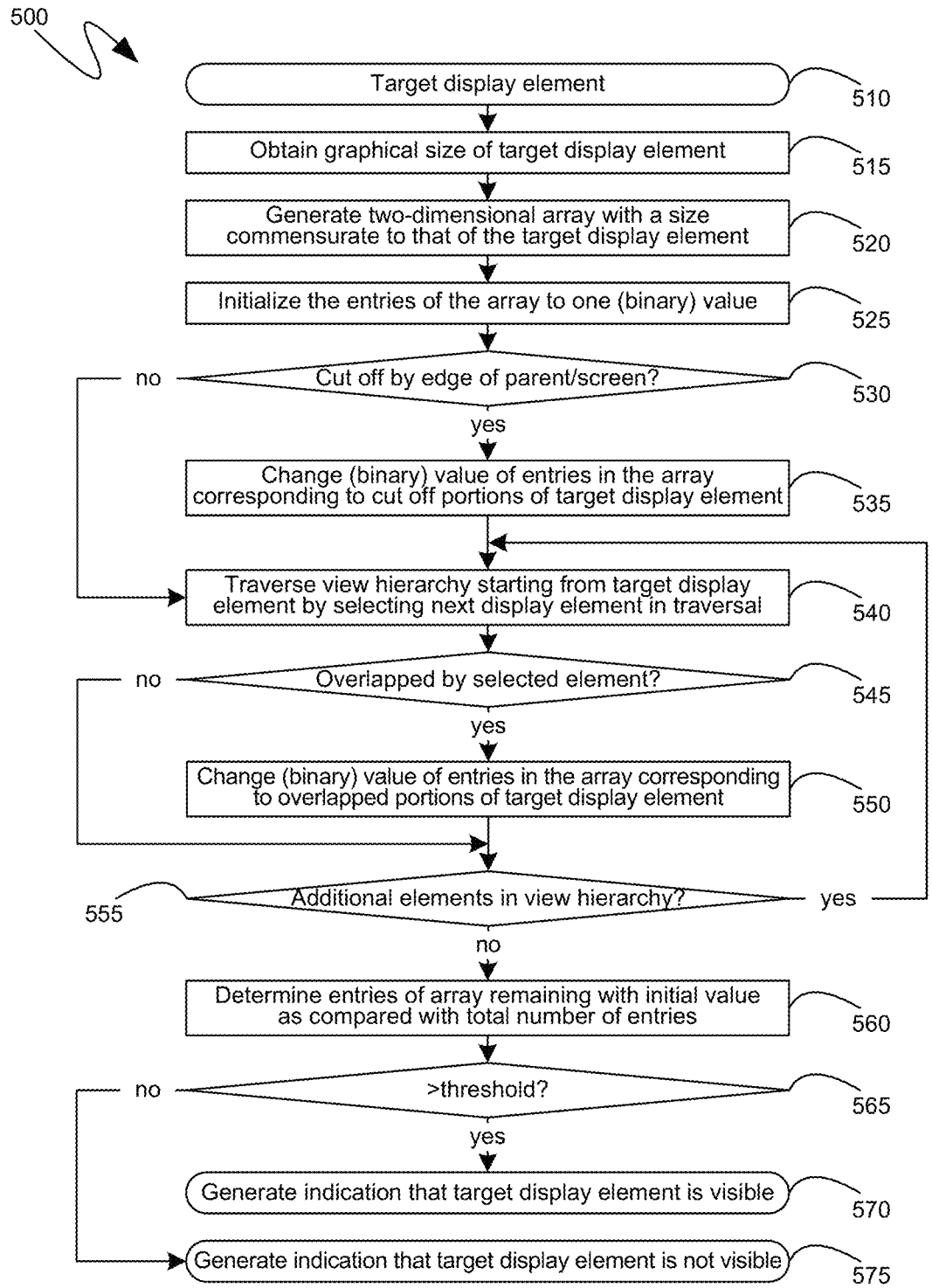
FIG. 5 is a flow diagram of an exemplary mechanism for determining a display element's visibility.

Turning to FIG. 5, the exemplary flow diagram 500 shown therein illustrates an exemplary series of steps that can be performed to determine whether a target display element is sufficiently visible to trigger responsive actions including, for example, the provision of benefits and other like actions based upon the visible presentation of the target display element. Initially, at step 510, as illustrated in FIG. 5, the target display element can be identified as the display element whose visibility is to be determined in accordance with the mechanisms described herein. Subsequently, at step 515, the graphical size of the target display element can be obtained. As indicated previously, such a graphical size can be expressed in terms of various graphical quantum, such as pixels, points, picas, and other like graphical quantum. At step 520, a two dimensional array, whose size, in columns and rows, is commensurate to the obtained size of the target display element, can be created. As indicated previously, according to one aspect, the quantity of columns and rows in the two-dimensional array can be equivalent to the quantity of pixels, or other like quantum, in the target display element. As also indicated previously, according to other aspects, individual elements of the two dimensional array can represent multiple pixel areas or portions of the target display element.

At step 525, the entries of the array that was created at step 520 can be initialized to an initial value. As indicated previously, according to one aspect, such a value can be a binary value of either "zero" or "one". At steps 530 through 555, determinations can be made as to whether certain portions of the target display element are visible, or, conversely, have been cut off or blocked by other containers, boundaries, or other display elements. For example, at step 530, a determination can be made as to whether a portion of the target display element is cut off by an edge of either a display element containing the target display element, previously nominated a "parent display element" or whether portions of the target display elements are cut off by an edge of the overall display device. If, at step 530, it is determined that at least a portion of the target display element is cut off, processing can proceed to step 535, and corresponding entries in the array, generated at step 520, can have their values changed from the values with which they were initialized, at step 525, to different values. If binary values are utilized, then, at step 535, those entries in the array corresponding to the cutoff portions of the target display element can simply be changed to the other binary value. Subsequently, processing can proceed to step 540. Returning back to step 530, if the determination, at step 530, determines that a target display element is not cut off by the edge of a parent, or container, display element, nor by the boundaries of the display device, then processing can proceed directly to step 540.

At step 540, traversal of a view hierarchy, such as that described in detail above, can commence with the target display element, and a selection of a subsequent display element in such a traversal. At step 545, determination can be made as to whether the display element, selected at step 540, overlaps the target display element. If, at step 545, it is determined that the display element, selected in step 540, does overlap the target display element, then, at step 550, corresponding entries in the array, which was generated at step 520, can have their values changed from the values with which they were initialized, at step 525, to different values. Again, if binary values are utilized, then, at step 550, those entries in the array corresponding to the overlapped portions of the target display element can simply be changed to the other binary value. Processing can then proceed to step 555 to determine whether all of the display elements in the view hierarchy have been considered. Processing can also proceed directly to step 555, from step 545, if, at step 545, it is determined that the display element, selected at step 540, does not overlap the target display element. If, at step 555, it is determined that additional, unconsidered display elements remain, processing can return to step 540 and the next display element in the traversal of the view hierarchy, again, as detailed above, can be selected. Steps 540, 545, 550 and 555 can be repeated until the view hierarchy is traversed.

Although illustrated as separate steps, the determinations of steps 530 and 545 can, alternatively, be performed in a single analysis. For example, for a discrete portion of the target display element, a single determination can be made as to whether that portion is either overlapped by another display element in the view hierarchy or is cut off by a parent display element or the boundaries of the physical display. Such a singular determination can then be performed for each of the portions of the target display element. In such an instance, the steps 530 and 545 could be combined and represented with a single determination step. If, as part of that single step, it was determined that a portion of the target display element was either overlapped or cut off, then processing could proceed to change the relevant values of those entries in the array corresponding to the cut off or overlapped portions in another unitary step that takes the place of steps 535 and 550.

Returning to the flow diagram 500 as illustrated in FIG. 5, once the traversal of the view hierarchy is complete, then, at step 560, the entries in the array indicative of portions of the target display element that have been determined to be visible can be compared with the total number of entries in the array, and, if, at step 565, such a comparison is greater than a threshold ratio, percentage, or the like, an indication can be generated, at step 570, that the target display element is visible. Conversely, if, at step 565, it is determined that the ratio between the entries in the array that are indicative of visible portions of the target display element and the total number of entries in the array is less than the threshold amount, then processing can proceed to step 575, and an indication that the target display element is not visible can be generated. As will be recognized by those skilled in the art, in a mathematically equivalent manner, step 560 can compare the quantity of entries in the array whose value had changed, or the quantity of entries in the array indicative of not displayed portions of the target display element, to the overall, aggregate quantity of entries in the array. In such an instance, the determination, at step 565, would be whether such a ratio is less than a threshold amount, in order for the generation steps 570 and 575 to remain as illustrated in FIG. 5. As will be recognized by those skilled in the art, the generation of a two-dimensional array, the binary operations described, and the aggregation of entries in a two-dimensional array, can be operations that can be performed very quickly and very efficiently by modern computer processors. Consequently, the steps illustrated exemplary flow diagram 500 of FIG. 5 can result in the generation of indications of whether the target display element is visible or not visible in a simpler, faster, and more efficient manner then prior mechanisms relying on surface area determinations, and other like more complex computations.

Figure 6:
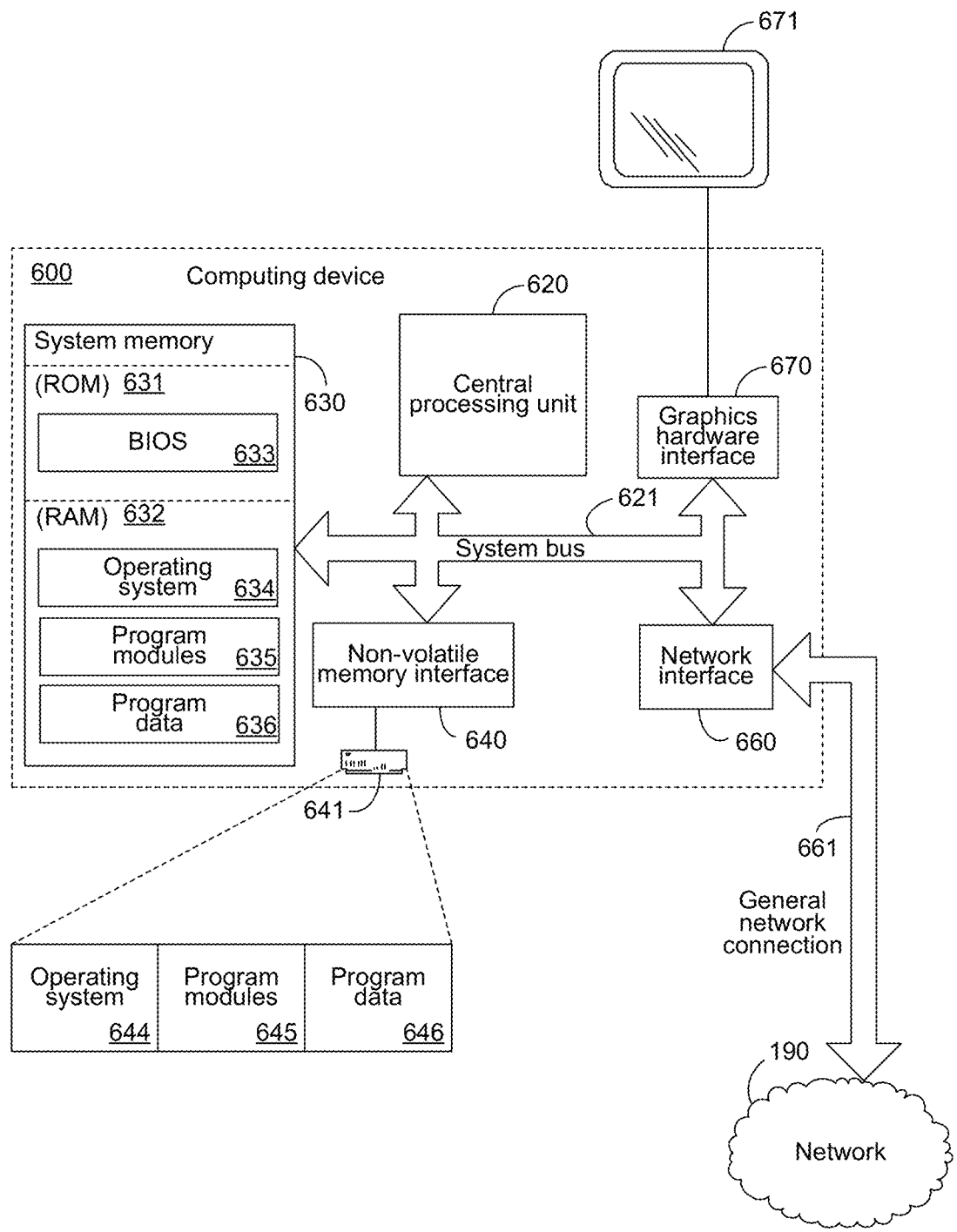
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 670 and a display device 671, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; a graphics hardware interface; and one or more computer-readable media comprising computer-executable instructions which, when executed by the one or more processing units, cause the computing device to: generate a two-dimensional array having a quantity of rows and columns based on a graphical size of a first display element, whose visibility on a physical display device, communicationally coupled to the computing device through the graphics hardware interface, is to be determined, the first display element being visually displayed on the physical display device; initialize each entry in the array with a first binary value; identify a first portion of the first display element that is not visually displayed on the physical display device; change, to a second binary value differing from the first binary value, each entry in the array corresponding to the identified first portion of the first display element; and generate a determination that the first display element is sufficiently visible if a quantity of entries in the array set to the first binary value, as compared with a total quantity of entries in the array, exceeds a threshold.

A second example is the computing device of the first example, wherein the computer-executable instructions causing the computing device to identify the first portion comprise computer-executable instructions which, when executed by the one or more processing units, cause the computing device to identify a second display element, differing from the first display element, the second display element being visually displayed on the physical display device such that the second display element overlaps the first display element and prevents the first portion of the first display element from being visually displayed on the physical display device; and wherein further the second display element is a sibling display element to the first display element.

A third example is the computing device of the first example, wherein the computer-executable instructions causing the computing device to identify the first portion comprise computer-executable instructions which, when executed by the one or more processing units, cause the computing device to identify a second display element, differing from the first display element, the second display element defining visual boundaries beyond which the first portion of the first display element is not visually displayed on the physical display device; and wherein further the second display element is a parent display element to the first display element.

A fourth example is the computing device of the first example, wherein the computer-executable instructions causing the computing device to identify the first portion comprise computer-executable instructions which, when executed by the one or more processing units, cause the computing device to identify a second display element, differing from the first display element, the second display element being visually displayed on the physical display device such that the second display element overlaps the first display element and prevents the first portion of the first display element from being visually displayed on the physical display device; and wherein further the second display element is a notification generated by an operating system of the computing device.

A fifth example is the computing device of the first example, wherein the first display element is visually positioned such that the first portion of the first display element extends beyond a boundary of the physical display device and the first portion is for that reason not visually displayed on the physical display device.

A sixth example is the computing device of the first example, wherein the quantity of rows of the two-dimensional array is equivalent to a height of the first display element in pixels and wherein further the quantity of columns of the two-dimensional array is equivalent to a width of the first display element in pixels.

A seventh example is the computing device of the first example, wherein a user interface visually presented on the physical display device is generated in accordance with a view hierarchy; and wherein further the computer-executable instructions causing the computing device to identify the first portion comprise computer-executable instructions which, when executed by the one or more processing units, cause the computing device to traverse the view hierarchy to identify the first portion.

An eighth example is a method of increasing a speed, and reducing a processor load, of determining whether more than a threshold amount of a first display element is visible on a physical display device communicatively coupled to a computing device performing the method, the method comprising: generating, on the computing device, a two-dimensional array having a quantity of rows and columns based on a graphical size of the first display element; initializing, on the computing device, each entry in the array with a first binary value; identifying, on the computing device, a first portion of the first display element that is not visually displayed on the physical display device; changing, on the computing device, to a second binary value differing from the first binary value, each entry in the array corresponding to the identified first portion of the first display element; and determining, on the computing device, that the first display element is sufficiently visible if a quantity of entries in the array set to the first binary value, as compared with a total quantity of entries in the array, exceeds a threshold.

A ninth example is the method of the eighth example, wherein the identifying comprises identifying a second display element, differing from the first display element, that is visually displayed on the physical display device such that the second display element overlaps the first display element and prevents the first portion of the first display element from being visually displayed on the physical display device; and wherein further the second display element is a sibling display element to the first display element.

A tenth example is the method of the eighth example, wherein the identifying comprises identifying a second display element, differing from the first display element, that defines visual boundaries beyond which the first portion of the first display element is not visually displayed on the physical display device; and wherein further the second display element is a parent display element to the first display element.

A eleventh example is the method of the eighth example, wherein the identifying comprises identifying a second display element, differing from the first display element, that is visually displayed on the physical display device such that the second display element overlaps the first display element and prevents the first portion of the first display element from being visually displayed on the physical display device; and wherein further the second display element is a notification generated by an operating system of the computing device.

A twelfth example is the method of the eighth example, wherein the first display element is visually positioned such that the first portion of the first display element extends beyond a boundary of the physical display device and the first portion is for that reason not visually displayed on the physical display device.

A thirteenth example is the method of the eighth example, wherein the quantity of rows of the two-dimensional array is equivalent to a height of the first display element in pixels and wherein further the quantity of columns of the two-dimensional array is equivalent to a width of the first display element in pixels.

A fourteenth example is the method of the eighth example, wherein a user interface, that is visually presented on the physical display device by the computing device, is generated in accordance with a view hierarchy; and wherein further the computer-executable instructions causing the computing device to identify the first portion comprise computer-executable instructions which, when executed by the one or more processing units, cause the computing device to traverse the view hierarchy to identify the first portion.

A fifteenth example is one or more computer-readable storage media comprising computer-executable instructions which, when executed by one or more processing units of a computing device, cause the computing device to: generate a two-dimensional array having a quantity of rows and columns based on a graphical size of a first display element, whose visibility on a physical display device, communicationally coupled to the computing device, is to be determined, the first display element being visually displayed on the physical display device; initialize each entry in the array with a first binary value; identify a first portion of the first display element that is not visually displayed on the physical display device; change, to a second binary value differing from the first binary value, each entry in the array corresponding to the identified first portion of the first display element; and generate a determination that the first display element is sufficiently visible if a quantity of entries in the array set to the first binary value, as compared with a total quantity of entries in the array, exceeds a threshold.

A sixteenth example is the computer-readable storage media of the fifteenth example, wherein the computer-executable instructions for identifying the first portion comprise computer-executable instructions which, when executed by the one or more processing units, cause the computing device to identify a second display element, differing from the first display element, the second display element being visually displayed on the physical display device such that the second display element overlaps the first display element and prevents the first portion of the first display element from being visually displayed on the physical display device; and wherein further the second display element is a sibling display element to the first display element.

A seventeenth example is the computer-readable storage media of the fifteenth example, wherein the computer-executable instructions for identifying the first portion comprise computer-executable instructions which, when executed by the one or more processing units, cause the computing device to identify a second display element, differing from the first display element, the second display element defining visual boundaries beyond which the first portion of the first display element is not visually displayed on the physical display device; and wherein further the second display element is a parent display element to the first display element.

A eighteenth example is the computer-readable storage media of the fifteenth example, wherein the computer-executable instructions for identifying the first portion comprise computer-executable instructions which, when executed by the one or more processing units, cause the computing device to identify a second display element, differing from the first display element, the second display element being visually displayed on the physical display device such that the second display element overlaps the first display element and prevents the first portion of the first display element from being visually displayed on the physical display device; and wherein further the second display element is a notification generated by an operating system of the computing device.

A nineteenth example is the computer-readable storage media of the fifteenth example, wherein the first display element is visually positioned such that the first portion of the first display element extends beyond a boundary of the physical display device and the first portion is for that reason not visually displayed on the physical display device.

An twentieth example is the computer-readable storage media of the fifteenth example, wherein the quantity of rows of the two-dimensional array is equivalent to a height of the first display element in pixels and wherein further the quantity of columns of the two-dimensional array is equivalent to a width of the first display element in pixels.

As can be seen from the above descriptions, mechanisms for determining a display element's visibility have been presented. In view of the many possible variations of the subject matter described herein, we claim as our invention all such embodiments as may come within the scope of the following claims and equivalents thereto.

We claim:
1. A computing device comprising:
one or more processing units;
a graphics hardware interface communicationally coupled to a physical display device on which the graphics hardware interface has caused to be physically displayed multiple visual display elements; and
one or more computer-readable media comprising computer-executable instructions which, when executed by the one or more processing units, cause the computing device to:
generate a two-dimensional array data structure having a quantity of rows and columns based on a graphical size of a target display element whose visibility on the physical display device is to be determined, the target display element being one of the multiple visual display elements that are physically displayed on the physical display device;
initialize the array data structure by storing a first binary value in each entry of the array data structure;
traverse a view hierarchy, comprising the multiple visual display elements, by separately evaluating, one-at-a-time, individual display elements of the view hierarchy in an ordered manner, the view hierarchy comprising both the target display element and multiple other display elements;
for each individual display element of the view hierarchy that is separately evaluated as part of the traversing, identify, if the individual display element being evaluated has a sibling relationship with either the target display element or a display element having a parent relationship with the target display element, an overlapped portion of the target display element that is not visually displayed on the physical display device because it is overlapped by the individual display element being evaluated and identify, if the individual display element being evaluated has the parent relationship with the target display element, a cut off portion of the target display element that is not visually displayed on the physical display device because it extends beyond one or more visual boundaries of the individual display element being evaluated and is, therefore, cut off by the individual display element being evaluated;
change to a second binary value each entry in the array data structure corresponding to the identified overlapped portion or the identified cut off portion of the target display element;
aggregate the binary values stored in each entry of the array data structure; and
generate a determination that the target display element is sufficiently visible if a comparison, between a quantity of entries in the array data structure that are set to the first binary value and a total quantity of entries in the array data structure, exceeds a threshold, the comparison being based on the aggregation;
wherein a first display element has the parent relationship with a second display element if the first display element's boundaries delineate a threshold beyond which both the first display element and the second display element are not visually displayed on the physical display device; and wherein the first display element has the sibling relationship with the second display element if: the first display element and the second display element are both visually contained within a same parent display element and the first display element can visually overlap the second display element such that an overlapping portion of the first display element is visible in place of an overlapped portion of the second display element, the overlapped portion of the second display element being, therefore, not visible.

2. The computing device of claim 1, wherein the one or more computer-readable media comprise further computer-executable instructions which, when executed by the one or more processing units, cause the computing device to select a notification display element; identify an overlapped portion of the target display element that is not visually displayed on the physical display device because the selected notification display element is visually presented over the overlapped portion; change to the second binary value each entry in the array data structure corresponding to the identified overlapped portion of the target display element; and repeat the selecting the notification display element, the identifying the overlapped portion and the changing for other notification display elements.

3. The computing device of claim 1, wherein the computer-executable instructions for identifying the cut off portion comprise computer-executable instructions which, when executed by the one or more processing units, cause the computing device to determine that the target display element is visually positioned such that the identified cut off portion of the target display element is that portion which extends beyond a boundary of the physical display device and is for that reason not visually displayed on the physical display device.

4. The computing device of claim 1, wherein the quantity of rows of the two-dimensional array data structure is equivalent to a height of the target display element in pixels and wherein further the quantity of columns of the two-dimensional array data structure is equivalent to a width of the first display element in pixels.

5. A method of increasing a speed, and reducing a processor load, of determining whether more than a threshold amount of a target display element is visible on a physical display device communicationally coupled to a computing device performing the method, the physical display device having physically displayed thereon multiple visual display elements, the method comprising:

generating, on the computing device, a two-dimensional array data structure having a quantity of rows and columns based on a graphical size of a target display element, the target display element being one of the multiple visual display elements that are physically displayed on the physical display device;

initializing, on the computing device, the array data structure by storing a first binary value in each entry of the array data structure;

traversing, on the computing device, a view hierarchy, comprising the multiple visual display elements, by separately evaluating, one-at-a-time, individual display elements of the view hierarchy in an ordered manner, the view hierarchy comprising both the target display element and multiple other display elements;

for each individual display element of the view hierarchy that is separately evaluated as part of the traversing, identifying, if the individual display element being evaluated has a sibling relationship with either the target display element or a display element having a parent relationship with the target display element, an overlapped portion of the target display element that is not visually displayed on the physical display device because it is overlapped by the individual display element being evaluated and identify, if the individual display element being evaluated has the parent relationship with the target display element, a cut off portion of the target display element that is not visually displayed on the physical display device because it extends beyond one or more visual boundaries of the individual display element being evaluated and is, therefore, cut off by the individual display element being evaluated;

changing, on the computing device, to a second binary value each entry in the array data structure corresponding to the identified overlapped portion or the identified cut off portion of the target display element;

aggregating, on the computing device, the binary values stored in each entry of the array data structure; and determining, on the computing device, that the target display element is sufficiently visible if a comparison, between a quantity of entries in the array data structure that are set to the first binary value and a total quantity of entries in the array data structure, exceeds a threshold, the comparison being based on the aggregation;

wherein a first display element has the parent relationship with a second display element if the first display element's boundaries delineate a threshold beyond which both the first display element and the second display element are not visually displayed on the physical display device; and wherein the first display element has the sibling relationship with the second display element if: the first display element and the second display element are both visually contained within a same parent display element and the first display element can visually overlap the second display element such that an overlapping portion of the first display element is visible in place of an overlapped portion of the second display element, the overlapped portion of the second display element being, therefore, not visible.

6. The method of claim 5, further comprising selecting a notification display element; identifying an overlapped portion of the target display element that is not visually displayed on the physical display device because the selected notification display element is visually presented over the overlapped portion; change to the second binary value each entry in the array data structure corresponding to the identified overlapped portion of the target display element; and repeat the selecting the notification display element, the identifying the overlapped portion and the changing for other notification display elements.

7. The method of claim 5, wherein the identifying the cut off portion comprises determining that the target display element is visually positioned such that the identified cut off portion of the target display element is that portion which extends beyond a boundary of the physical display device and is for that reason not visually displayed on the physical display device.

8. The method of claim 5, wherein the quantity of rows of the two-dimensional array data structure is equivalent to a height of the target display element in pixels and wherein further the quantity of columns of the two-dimensional array data structure is equivalent to a width of the target display element in pixels.

9. One or more computer readable storage media comprising computer-executable instructions which, when executed by one or more processing units of a computing device, cause the computing device to:
generate a two-dimensional array data structure having a quantity of rows and columns based on a graphical size of a target display element, the target display element being one of multiple visual display elements that are physically displayed on a physical display device that is communicationally coupled to the computing device;
initialize the array data structure by storing a first binary value in each entry of the array data structure;
traverse a view hierarchy, comprising the multiple visual display elements, by separately evaluating, one-at-a-time, individual display elements of the view hierarchy in an ordered manner, the view hierarchy comprising both the target display element and multiple other display elements;
for each individual display element of the view hierarchy that is separately evaluated as part of the traversing, identify, if the individual display element being evaluated has a sibling relationship with either the target display element or a display element having a parent relationship with the target display element, an overlapped portion of the target display element that is not visually displayed on the physical display device because it is overlapped by the individual display element being evaluated and identify, if the individual display element being evaluated has the parent relationship with the target display element, a cut off portion of the target display element that is not visually displayed on the physical display device because it extends beyond one or more visual boundaries of the individual display element being evaluated and is, therefore, cut off by the individual display element being evaluated;
change to a second binary value each entry in the array data structure corresponding to the identified overlapped portion or the identified cut off portion of the target display element;
aggregate the binary values stored in each entry of the array data structure; and
generate a determination that the target display element is sufficiently visible if a comparison, between a quantity of entries in the array data structure that are set to the first binary value and a total quantity of entries in the array data structure, exceeds a threshold, the comparison being based on the aggregation;
wherein a first display element has the parent relationship with a second display element if the first display element's boundaries delineate a threshold beyond which both the first display element and the second display element are not visually displayed on the physical display device; and
wherein the first display element has the sibling relationship with the second display element if: the first display element and the second display element are both visually contained within a same parent display element and the first display element can visually overlap the second display element such that an overlapping portion of the first display element is visible in place of an overlapped portion of the second display element, the overlapped portion of the second display element being, therefore, not visible.

10. The computer storage media of claim 9, wherein the one or more computer storage media comprise further computer-executable instructions which, when executed by the one or more processing units, cause the computing device to select a notification display element; identify an overlapped portion of the target display element that is not visually displayed on the physical display device because the selected notification display element is visually presented over the overlapped portion; change to the second binary value each entry in the array data structure corresponding to the identified overlapped portion of the target display element; and repeat the selecting the notification display element, the identifying the overlapped portion and the changing for other notification display elements.

11. The computer storage media of claim 9, wherein the computer-executable instructions for identifying the cut off portion comprise computer-executable instructions which, when executed by the one or more processing units, cause the computing device to determine that the target display element is visually positioned such that the identified cut off portion of the target display element is that portion which extends beyond a boundary of the physical display device and is for that reason not visually displayed on the physical display device.

12. The computer storage media of claim 9, wherein the quantity of rows of the two-dimensional array data structure is equivalent to a height of the target display element in pixels and wherein further the quantity of columns of the two-dimensional array data structure is equivalent to a width of the target display element in pixels.

13. The computing device of claim 2, wherein the computer-executable instructions for identifying the overlapped portion comprise computer-executable instructions, which, when executed by the one or more processing units, cause the computing device to determine a transparency of the notification display element and only change to the second binary value each entry in the array data structure corresponding to the identified overlapped portion of the target display element if the determined transparency of the notification display element is less than a predetermined threshold transparency.

14. The computing device of claim 1, wherein an entry in the array data structure corresponds to either the identified overlapped portion or the identified cut off portion if more than a threshold part of a quantum of the target display element that is represented by the entry is within the identified overlapped portion or is within the identified cut off portion.

15. The method of claim 6, wherein the identifying the overlapped portion comprises determining a transparency of the notification display element and only changing to the second binary value each entry in the array data structure corresponding to the identified overlapped portion of the target display element if the determined transparency of the notification display element is less than a predetermined threshold transparency.

16. The method of claim 5, wherein an entry in the array data structure corresponds to either the identified overlapped portion or the identified cut off portion if more than a threshold part of a quantum of the target display element that is represented by the entry is within the identified overlapped portion or is within the identified cut off portion.

17. The computer storage media of claim 9, wherein an entry in the array data structure corresponds to either the identified overlapped portion or the identified cut off portion if more than a threshold part of a quantum of the target display element that is represented by the entry is within the identified overlapped portion or is within the identified cut off portion.

18. The computing device of claim 1, wherein the computer-executable instructions for traversing the view hierarchy comprise computer-executable instructions, which, when executed by the one or more processing units, cause the computing device to:
   select a first sibling display element of the target display element;
   perform the identifying the overlapped portion with the selected first sibling display element;
   repeat, one-at-a-time, the selecting and the performing the identifying with other, different sibling display elements;
   subsequently select a first parent display element of the target display element; and
   perform the identifying the cut off portion with the selected first parent display element.

19. The method of claim 5, wherein the traversing the view hierarchy comprises:
   selecting a first sibling display element of the target display element;
   performing the identifying the overlapped portion with the selected first sibling display element;
   repeating, one-at-a-time, the selecting and the performing the identifying with other, different sibling display elements;
   subsequently selecting a first parent display element of the target display element; and
   performing the identifying the cut off portion with the selected first parent display element.

20. The computer readable storage media of claim 9, wherein the computer-executable instructions for traversing the view hierarchy comprise computer-executable instructions, which, when executed by the one or more processing units, cause the computing device to:
   select a first sibling display element of the target display element;
   perform the identifying the overlapped portion with the selected first sibling display element;
   repeat, one-at-a-time, the selecting and the performing the identifying with other, different sibling display elements;
   subsequently select a first parent display element of the target display element; and
   perform the identifying the cut off portion with the selected first parent display element.

* * * * *